United States Patent [19]

Nonaka et al.

[11] Patent Number: 5,185,392

[45] Date of Patent: Feb. 9, 1993

[54] POLYARYLENE SULFIDE RESIN COMPOSITION

[75] Inventors: Toshifumi Nonaka; Toshikatsu Nitoh, both of Shizuoka, Japan; Andrew Auerbach, Livingston, N.J.

[73] Assignee: Polyplastics Co., Inc., Osaka, Japan

[21] Appl. No.: 618,895

[22] Filed: Dec. 26, 1990

Related U.S. Application Data

[62] Division of Ser. No. 541,941, Jun. 22, 1990, abandoned.

[30] Foreign Application Priority Data

Jun. 27, 1989 [JP] Japan .................. 1-164310
Jun. 27, 1989 [JP] Japan .................. 1-164311

[51] Int. Cl.$^5$ ................................. C08K 5/51
[52] U.S. Cl. ............................. 524/128; 524/262; 524/263; 524/425; 524/609
[58] Field of Search ........................... 524/128

[56] References Cited

U.S. PATENT DOCUMENTS 4,451,601 5/1984 Blackwell ............................ 524/609
4,703,074 10/1987 Izutsu et al. ......................... 524/443
4,935,473 6/1990 Fukuda et al. ....................... 524/609

FOREIGN PATENT DOCUMENTS 291915 11/1988 European Pat. Off. .
407926 1/1991 European Pat. Off. ............ 524/126
63-159470 7/1988 Japan .................... 524/120

*Primary Examiner*—Melvyn I. Marquis
*Assistant Examiner*—Mark Sweet
*Attorney, Agent, or Firm*—Depaoli & O'Brien

[57] ABSTRACT

A polyarylene sulfide resin composition useful for molded parts comprises (A) 100 parts by weight of a polyarylene sulfide, (B) 0.01 to 10 parts by weight of an organic bisphosphite of the formula:

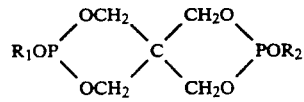

in which $R_1$ and $R_2$ are each an alkyl, an alkyl having at least one substituent, an aryl, an aryl having at least one substituent or an alkoxy, (C) 0 to 400 parts by weight of an inorganic filler and (D) 0.01 to 5 parts by weight of at least one alkoxy silane.

17 Claims, No Drawings

POLYARYLENE SULFIDE RESIN COMPOSITION

This application is a division of application Ser. No. 541,941, filed Jun. 22, 1990 now abandoned.

BACKGROUND OF THE INVENTION

The present invention relates to polyarylene sulfide resin compositions. More particularly, the present invention is concerned with polyarylene sulfide resin compositions which provide molded articles thereof with remarkably improved resistance to discoloration.

In recent years, thermoplastic resins having a combination of excellent mechanical properties, high heat resistance and high chemical resistance with flame retardance have been desired as materials for electrical and electronic equipment components, automobile equipment components, and chemical equipment components.

Polyarylene sulfide resin including polyphenylene sulfide is one of the resins capable of meeting this desire. The demand for polyarylene sulfide has expanded because such resins possess excellent properties for the cost.

However, polyarylene sulfide resin exhibits many unfavorable phenomena relative to appearance when processed by injection molding. For example, problems including changes in the hue of polyarylene sulfide molded articles as a whole in comparison with the hue before molding, the occurrence of black stripes or mottled discoloration, and a high susceptibility to discoloration during use of the molded articles at high temperature, all hereinafter simply referred to as "discoloration", have resulted. In order to solve these discoloration problems, Japanese Patent Laid-Open No. 1735/1972) proposed to add an organic phosphite to the polyarylene sulfide resin. However, this method has been found to yield various problems. Specifically, the heat resistance of the phosphite additive is poor and an evaporation gas or a decomposition gas is liable to occur during molding. Accordingly, addition of a phosphite has not been regarded as satisfactory in respect to the processing, properties, and appearance of polyarylene sulfide molded articles.

SUMMARY OF THE INVENTION

The present invention is directed to a polyarylene sulfide resin composition which is resistant to discoloration during molding and evolves no decomposition gas. It has been found that a polyarylene sulfide composition comprising an organic bisphosphite or organic bisphosphonite compound having two phosphorus atoms in its molecule represented by the following formulae (1) to (3) has excellent heat stability, hardly evolves a decomposition gas or an evaporation gas at extruding and molding temperatures, presents no danger of ignition, does not hinder the moldability of the resin, and exhibits a higher ability to suppress discoloration of polyarylene sulfide than the prior art composition. Further, the present inventors have found that the incorporation of a particular silane compound into the composition is effective in further improving the above-described properties.

The polyarylene sulfide molding composition of the present invention comprises (A) 100 parts by weight of a polyarylene sulfide and (B) 0.01 to 10 parts by weight of an organic bisphosphite or bisphosphonite having the formulae (1), (2) and (3):

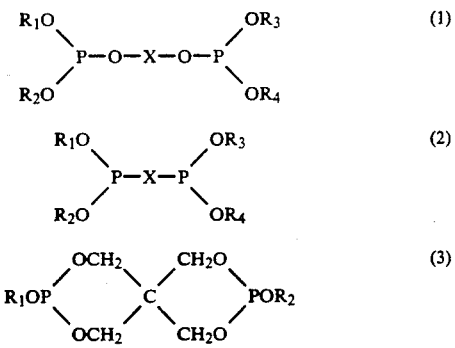

in which $R_1$, $R_2$, $R_3$ and $R_4$ are each an alkyl, an alkyl having at least one substituent, an aryl, an aryl having at least one substituent or an alkoxy and X is an alkylene, an alkylene having at least one substituent, an arylene or an arylene having at least one substituent.

The composition may further comprise (C) up to 400 parts by weight of an inorganic filler or (D) 0.01 to 5 parts by weight of at least one alkoxysilane such as aminoalkoxysilanes, epoxyalkoxysilanes, mercaptoalkoxysilanes and vinylalkoxysilanes.

It is preferable that $R_2$, $R_3$ and $R_4$ are, independently of one another, selected from an alkyl having 5 to 23 carbon atoms, an alkyl having 5 to 23 carbon atoms and having thereon a hydroxy, an aryl selected from the group consisting of phenyl, naphthyl and biphenyl, an aryl selected from the group consisting of phenyl, naphthyl and biphenyl and having thereon an alkyl having 2 to 8 carbon atoms such as methyl and t-butyl or a hydroxy and an alkoxy having 5 to 23 carbon atoms; and X is selected from the group consisting of an alkylene having 2 to 12 carbon atoms, an oxyalkylene having the formula: $-[(CH_2)_n-O-]_m-$, n being 2 to 4, m being 2 to 4, an oxyalkylene having the formula: $-[(CH_2)_n-O-]_m-$, n being 2 to 4, m being 2 to 4 and having thereon a hydroxy or an alkyl having 1 to 6 carbon atoms such as methyl, an arylene selected from the group consisting of phenylene, biphenylene and bisphenylene and an arylene selected from the group consisting of phenylene, biphenylene and bisphenylene and having thereon an alkyl having 1 to 6 carbon atoms such as methyl and t-butyl.

Specifically, according to the present invention, there is provided a polyarylene sulfide resin composition comprising:

(A) 100 parts by weight of a polyarylene sulfide resin and, added thereto, (B) 0.01 to 10 parts by weight of an organic bisphosphite represented by the following formula (1) or (2):

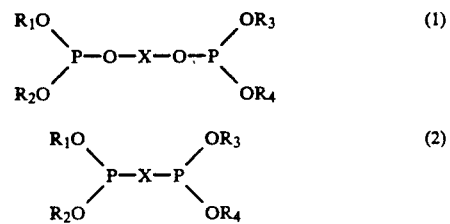

wherein $R_1$, $R_2$, $R_3$ and $R_4$ which may be the same or different are each a group selected from among alkyl, substituted alkyl, aryl, substituted aryl, and alkoxy groups and X is a divalent alkylene, substituted alkylene, arylene or substituted arylene group, and (C) 0 to 400 parts by weight of an inorganic filler.

Specifically, according to the present invention, there is provided a polyarylene sulfide resin composition comprising:

(A) 100 parts by weight of a polyarylene sulfide resin and, added thereto, (B) 0.01 to 10 parts by weight of an organic bisphosphite represented by the following formula (3):

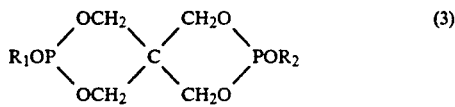

(3)

wherein $R_1$ and $R_2$ which may be the same or different are each a group selected from among alkyl, substituted alkyl, aryl, substituted aryl, and alkoxy groups, and (C) 0 to 400 parts by weight of an inorganic filler.

Furter, according to the present invention, there is provided a polyarylene sulfide resin composition further comprising (D) 0.01 to 5 parts by weight of one or more silane compounds selected from among alkoxysilane, epoxyalkoxysilane, mercaptoalkoxysilane, and vinylalkoxysilane in addition to the above-described components (A), (B), and (C).

DETAILED DESCRIPTION OF THE INVENTION

The base resin as component (A) of the composition of the present invention is a polyarylene sulfide resin (PAS) and mainly comprises the following repeating units -(-Ar-S-)-, wherein Ar is an arylene group.

Examples of the arylene group include:

a p-phenylene group 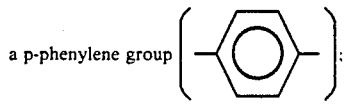

a m-phenylene group 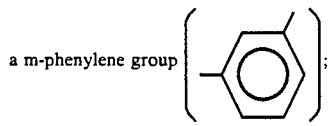

an o-phenylene group 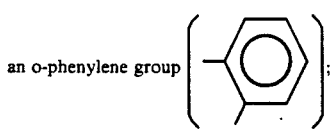

a substituted phenylene group 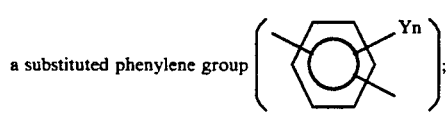

wherein Y is an alkyl group, preferably a $C_1$–$C_6$ alkyl group or a phenyl group and n is an integer of 1 to 4;

a p,p'-diphenylene sulfone group 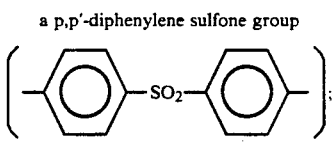

a p,p'-biphenylene group 

a p,p'-diphenylene ether group 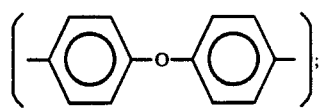

a p,p-diphenylene carbonyl group 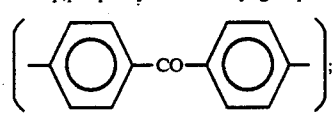

and a naphthalene group 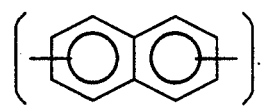

It is preferred to use a polymer comprising the same repeating units among arylene sulfide groups constituting the above-described arylene groups, i.e., a homopolymer. In some cases, a copolymer containing different kinds of repeating units is preferable from the viewpoint of workability of the composition.

The homopolymer is particularly preferably a substantially linear polymer comprising p-phenylene sulfide groups as the repeating unit wherein a p-phenylene group is used as the arylene group.

The copolymer may comprise two or more different kinds of arylene sulfide groups composed of the above-described arylene groups. Among them, combinations including a p-phenylene sulfide group and a m-phenylene sulfide group are particularly preferred. In particular, a copolymer comprising at least 50% by mole, preferably at least 70% by mole of p-phenylene sulfide groups is suitable from the viewpoint of properties such as heat resistance, moldability, and mechanical properties.

A copolymer comprising repeating units of the components in the block form (e.g., one described in Japanese Patent Laid-Open No. 14228/1986) is preferably used because it is substantially the same as the copolymer comprising repeating units of the components in the random form in workability but superior in heat resistance and mechanical properties.

Although the polyarylene sulfide resin as component (A) used in the present invention may be a polymer prepared by curing through oxidative crosslinking or thermal crosslinking, a polymer having a substantially linear structure and prepared by the polycondensation of monomers mainly composed of bifunctional monomers is preferred.

It is particularly suitable to use a linear polymer having a melt viscosity of $1 \times 10$ to $5 \times 10^4$ P, preferably 50 to $5 \times 10^4$ P, particularly preferably 100 to $5 \times 10^4$ P as determined under conditions of a temperature of 310° C. and a shear rate of 5/sec. When the melt viscosity is less than 10 P, the flowability is excessively high, which makes it difficult to conduct melt processing. Even though the molded article could be prepared, the mechanical properties thereof are unfavorably low. On the other hand, when the melt viscosity exceeds $5 \times 10^4$ P, it is difficult to conduct melt processing because the flowability is poor.

The organic bisphosphite or organic bisphoshonite compound added as component (B) in the present invention may be any compound as far as it has a structure represented by the above-described formulae (1) to (3).

In the formulae (1) to (3), $R_1$ to $R_4$ are selected from among alkyl, substituted alkyl, aryl, substituted aryl, and alkoxy groups and may be the same or different.

In particular, $R_1$ to $R_4$ are each preferably an alkyl group having 5 or more carbon atoms, a substituted alkyl group, an aryl group or a substituted aryl group from the viewpoint of stability during molding.

It is particularly preferred that $R_1$ to $R_4$ be each an alkyl group having 10 or more carbon atoms or an alkoxy group, or at least one of $R_1$ to $R_4$ be an aryl or substituted aryl group. Specifically, particularly preferred examples of the compound include substances respectively having structures A, B, C and D described in Note 1 to Tables 1 to 3.

X is a divalent alkylene, substituted alkylene, arylene or substituted arylene group.

The amount of component (B) used in the present invention and represented by the above-described formulae (1) to (3) is 0.01 to 10 parts by weight, preferably 0.1 to 5 parts by weight based on 100 parts by weight of the polyarylene sulfide resin. When the amount is too small, no effect intended in the present invention can be attained, while when the amount is excessively large, there arise unfavorable problems such as lowering in the properties and generation of a gas.

Although the inorganic filler as component (C) used in the present invention is not always necessary, it is preferred to incorporate this component for the purpose of preparing a molded article having excellent performance such as mechanical strength, heat resistance, dimensional stability (resistance to deformation and warping), and electrical properties. Any of fibrous and non-fibrous (particulate and flaky) fillers may be used as the inorganic filler depending upon the purpose.

Examples of the fibrous filler include inorganic fibrous substances such as glass fiber, asbestos fiber, carbon fiber, silica fiber, silica-alumina fiber, zirconia fiber, boron nitride fiber, silicon nitride fiber, boron fiber and potassium titanate fiber, and fibrous metals such as stainless steel, aluminum, titanium, copper, and brass. Among them, glass fiber and carbon fiber are representative fibrous fillers. It is also possible to use high-melting organic fibrous materials such as polyamides, fluororesins, and acrylic resins.

Examples of the particulate filler include carbon black, silicates such as silica, quartz powder, glass bead, glass powder, calcium silicate, aluminum silicate, kaolin, talc, clay, diatomaceous earth and wollastonite, metallic oxides such as iron oxide, titanium oxide, zinc oxide and alumina, metal salts of carbonic acid such as calcium carbonate and magnesium carbonate, metal salts of sulfuric acid such as calcium sulfate and barium sulfate, and other fillers such as silicon carbide, silicon nitride, boron nitride, and various powdery metals.

Examples of the flaky filler include mica, glass flake, and various metal foils.

These inorganic fillers may be used alone or in any combination of two or more. A combination of a fibrous filler, particularly a glass fiber or a carbon fiber with a particulate filler and/or a flaky filler is preferred particularly for the purpose of imparting a combination of mechanical strength with dimensional stability, electrical properties, etc.

A combination of a glass fiber having an average fiber length of 30 to 500 $\mu$m with an inorganic particulate material having an aspect ratio of 5 or less is particularly preferred.

It is preferred to use a binder or a surface treatment together with the filler according to need. Examples thereof include functional compounds such as epoxy compounds, isocyanate compounds, silane compounds, and titanate compounds. These compounds may be used by previously conducting surface treatement or binding treatment, or alternatively may be added simultaneously in the preparation of the material.

The amount of the inorganic filler used as component (C) is 0 to 400 parts by weight, preferably 10 to 250 parts by weight based on 100 parts by weight of the polyarylene sulfide resin as component (A). When the amount is too small, the mechanical strengths are poor, while when the amount is too large, not only does it become difficult to conduct molding operation but there also occurs a problem of reduction in the mechanical strengths of the molded article.

The silane compound which is preferably incorporated as component (D) of the present invention in the above-described components (A), (B), and (C) is one or more alkoxysilanes selected from among aminoalkoxysilane, epoxyalkoxysilane, mercaptoalkoxysilane, and vinylalkoxysilane.

The aminoalkoxysilane may be any silane compound as far as it has at least one amino group and two or three alkoxy groups per molecule, and examples thereof include $\gamma$-aminopropyltriethoxysilane, $\gamma$-aminopropyltrimethoxysilane, $\gamma$-aminopropylmethyldiethoxysilane, $\gamma$-aminopropylmethyldimethoxysilane, N-$\beta$(aminoethyl)-$\gamma$-aminopropyltriethoxysilane, N-$\beta$-(aminoethyl)-$\gamma$-aminopropyltrimethoxysilane, N-$\beta$-(aminoethyl)-$\gamma$-aminopropylmethyldiethoxysilane, N-$\beta$(aminoethyl)-$\gamma$-aminopropylmethyldimethoxysilane, N-phenyl-$\gamma$-aminopropyltriethoxysilane, and N-phenyl-$\gamma$-aminopropyltrimethoxysilane.

The epoxyalkoxysilane may be any silane compound as far as it has at least one epoxy group and two or three alkoxy groups per molecule, and examples thereof include $\gamma$-glycidoxypropyltrimethoxysilane, $\beta$-(3,4-epoxycyclohexyl)ethyltrimethoxysilane, and $\gamma$-glycidoxypropyltriethoxysilane.

The mercaptoalkoxysilane may be any silane compound as far as it has at least one mercapto group and two or three alkoxy groups per molecule, and examples thereof include $\gamma$-mercaptopropyltrimethoxysilane and $\gamma$-mercaptopropyltriethoxysilane.

The vinylalkoxysilane may be any silane compound as far as it has at least one vinyl group and two or three alkoxy groups per molecule, and examples thereof include vinyltriethoxysilane, vinyltrimethoxysilane and vinyltris ($\beta$-methoxyethoxy)silane.

The amount of the above-described alkoxysilane used in the present invention is 5 parts by weight or less, preferably 0.01 to 3 parts by weight based on 100 parts by weight of the polyarylene sulfide resin. When the amount is too small, no significant effect intended in the present invention can be attained, while when the amount is too large, mechanical properties are unfavorably lower.

It has been found that incorporation of component (D) is not only useful for improving the moldability and mechanical properties but also, when combined with the use of component (B), contributes to a further improvement in reducing the discoloration caused by molding and discoloration of the molded article with time at high temperature.

The composition of the present invention may be mixed with other thermoplastic resins in such a minor amount as will not hinder the object of the present invention. The other thermoplastic resins used herein may be any one which is stable at a high temperature. Examples thereof include aromatic polyesters comprising aromatic dicarboxylic acids and diols or hydroxy carboxylic acids, such as polyethylene terephthalate and polybutylene terephthalate, polyamide, polycarbonate, ABS, polyphenylene oxide, polyalkyl acrylate, polyacetal, polysulfone, polyether sulfone, polyether imide, polyether ketone, and fluororesin. It is also possible to use these thermoplastic resins in the form of a mixture of two or more.

Further, the composition of the present invention may contain known materials which are added to ordinary thermoplastic and thermosetting resins, i.e., stabilizers such as antioxidants and ultraviolet absorbers, antistatic agents, releasing agents, flame retardants, flame retarding assistants, colorants such as dyes and pigments, lubricants, and nucleating agents depending upon the intended performance.

The polyarylene sulfide resin composition of the present invention can be prepared by making use of facilities and methods employed in the preparation of ordinary synthetic resin compositions. They include, for example, a method which comprises mixing necessary components, kneading the mixture with a single-screw or twin-screw extruder, and conducting extrusion to prepare pellets for molding; a method wherein part of the necessary components are mixed together as a master batch and then molded; and a method wherein in order to improve the dispersion and mixing of each component, part or the whole of the polyarylene sulfide resin is pulverized, and mixing and melt extrusion are then conducted.

The composition of the present invention enables preparation of a molded article having remarkably improved resistance to discoloration, having high whiteness and less susceptible to stripe or mottled discoloration. Further, the polyarylene sulfide resin composition of the present invention has excellent heat resistance, hardly generates an evaporation gas or a decomposition gas during extruding or molding, hardly causes any trouble derived therefrom, and also has excellent moldability and mechanical properties.

EXAMPLES

The present invention will now be described in more detail by way of the following Examples which should not be construed as limiting the scope of the present invention.

EXAMPLES 1 TO 58 AND COMPARATIVE EXAMPLES 1 TO 6

Additives listed in Tables 1 to 5 were added respectively in the amounts specified in those Tables to a polyphenylene sulfide resin and premixed in a Henschel mixer for 5 min. Further, a commercially available glass fiber (a diameter of 13 μm and a length of 3 mm) and calcium carbonate were added respectively in amounts specified in the Table, and were mixed in a blender for 2 min. The mixture was extruded at a cylinder temperature of 310° C. to prepare pellets of a polyphenylene sulfide resin composition.

The pellets were molded into a flat test piece having a thickness of 33 mm and a size of 50 mm ×70 mm with an injection molding machine at a cylinder temperature of 320° C. and a mold temperature of 150° C., and the molded article was examined for hue by means of a differential colorimeter manufactured by Nippon Denshoku Co., Ltd.

The extent of black stripe or mottled discoloration occurring on the surface of the molded article was observed. The molten resin during the injection molding was subjected to free flow to determine the amount of the gas evolved therefrom. A tensile bar was molded from the pellets by means of an injection molding machine at a cylinder temperature of 320° C. and a mold temperature of 150° C. according to ASTM D-638, and the obtained bar was subjected to measurement of the tensile strength and tensile elongation. The results are shown in Tables 1 to 5.

Note 1: in Tables 1 to 3

A:

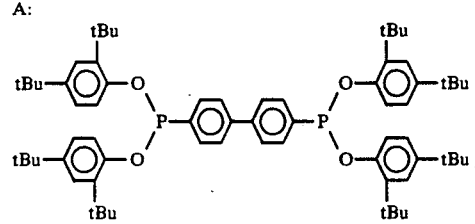

B:

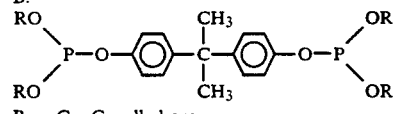

R = $C_{12}$-$C_{15}$ alkyl group

C:

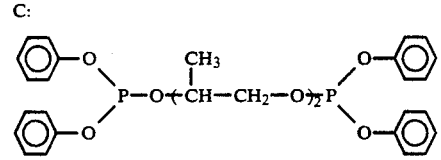

D:

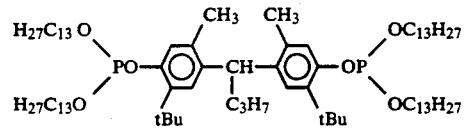

Note 1: in Table 4 and 5

A:

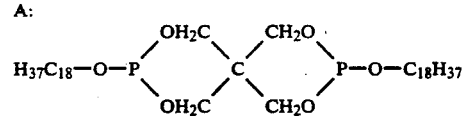

B:

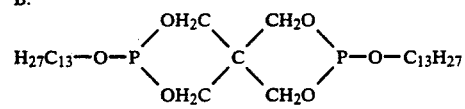

C:

-continued

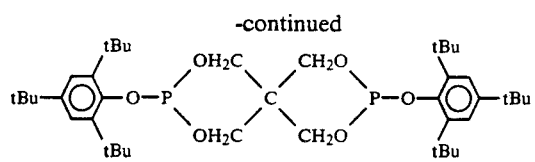

D:

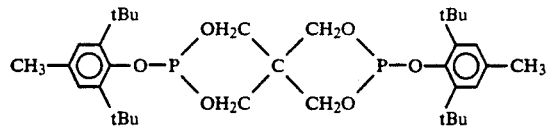

Note 1: in Tables 1 to 5

-continued

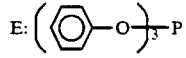

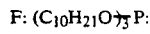

Note 2:

G: γ-aminopropyltriethoxysilane

H: γ-glycidoxypropyltrimethoxysilane

I: γ-mercaptopropyltrimethoxysilane

J: vinyltrimethoxysilane

TABLE 1

| | Composition | | | | Evaluation | | | | | | |
|---|---|---|---|---|---|---|---|---|---|---|---|
| | (A) PPS (pts.wt.) | (B) phosphorus compd. | | (C) glass fiber (pts.wt.) | (C) calcium carbonate (pts.wt.) | hue* | | | black stripe, discoloration | gas evolution | tensile strength (kg/cm²) | tensile elongation (%) |
| | | kind (Note:1) | (pts.wt.) | | | L | a | b | | | | |
| Ex. 1 | 100 | A | 1.5 | 0 | 0 | 65 | 0 | 9 | free | free | 840 | 10.0 |
| Ex. 2 | 100 | A | 0.1 | 65 | 0 | 62 | 0 | 8 | slight | free | 1760 | 1.6 |
| Ex. 3 | 100 | A | 0.5 | 65 | 0 | 67 | 1 | 9 | slight | free | 1760 | 1.6 |
| Ex. 4 | 100 | A | 1.5 | 65 | 0 | 69 | 1 | 11 | free | free | 1750 | 1.6 |
| Ex. 5 | 100 | A | 3 | 65 | 0 | 69 | 1 | 11 | free | slight | 1750 | 1.6 |
| Ex. 6 | 100 | A | 1.5 | 100 | 100 | 75 | 0 | 11 | free | free | 1450 | 1.0 |
| Ex. 7 | 100 | B | 0.1 | 65 | 0 | 64 | 0 | 7 | slight | free | 1750 | 1.6 |
| Ex. 8 | 100 | B | 0.5 | 65 | 0 | 66 | 1 | 9 | slight | free | 1750 | 1.6 |
| Ex. 9 | 100 | B | 1.5 | 65 | 0 | 67 | 1 | 10 | slight | slight | 1750 | 1.6 |
| Ex. 10 | 100 | B | 3 | 65 | 0 | 68 | 0 | 10 | free | slight | 1740 | 1.6 |
| Ex. 11 | 100 | C | 0.1 | 65 | 0 | 63 | 1 | 8 | slight | free | 1750 | 1.6 |
| Ex. 12 | 100 | C | 0.5 | 65 | 0 | 65 | 1 | 9 | slight | free | 1740 | 1.6 |
| Ex. 13 | 100 | C | 1.5 | 65 | 0 | 67 | 0 | 11 | slight | slight | 1740 | 1.6 |
| Ex. 14 | 100 | C | 3 | 65 | 0 | 67 | 1 | 11 | free | slight | 1730 | 1.6 |
| Ex. 15 | 100 | D | 0.1 | 65 | 0 | 60 | 0 | 10 | slight | free | 1740 | 1.6 |
| Ex. 16 | 100 | D | 0.5 | 65 | 0 | 66 | −1 | 10 | slight | slight | 1740 | 1.6 |
| Ex. 17 | 100 | D | 1.5 | 65 | 0 | 68 | 1 | 12 | free | slight | 1740 | 1.6 |
| Ex. 18 | 100 | D | 3 | 65 | 0 | 70 | 0 | 13 | free | medium | 1720 | 1.5 |

*Hue: A higher L value of the sample suggests a higher whiteness and a less extent of discoloration.

TABLE 2

| | Composition | | | | | | | Evaluation | | | | | |
|---|---|---|---|---|---|---|---|---|---|---|---|---|---|
| | (A) PPS (pts. wt.) | (B) phosphorus compd. | | (C) glass fiber (pts.wt.) | (C) calcium carbonate (pts.wt.) | (D) silane compound | | hue* | | | black stripe, discoloration | gas evolution | tensile strength (kg/cm²) | tensile elongation (%) |
| | | kind (Note 1) | (pts. wt.) | | | kind (Note 2) | (pts. wt.) | L | a | b | | | | |
| Ex. 19 | 100 | A | 1.5 | 0 | 0 | G | 0.5 | 70 | 0 | 8 | free | free | 930 | 15.1 |
| Ex. 20 | 100 | A | 1.5 | 65 | 0 | G | 0.1 | 73 | 1 | 8 | free | free | 1770 | 1.6 |
| Ex. 21 | 100 | A | 1.5 | 65 | 0 | G | 0.5 | 75 | 0 | 9 | free | free | 1820 | 1.8 |
| Ex. 22 | 100 | A | 1.5 | 65 | 0 | G | 1.0 | 77 | 1 | 10 | free | free | 1840 | 1.8 |
| Ex. 23 | 100 | A | 1.5 | 100 | 100 | G | 0.5 | 79 | −1 | 7 | free | free | 1530 | 1.1 |
| Ex. 24 | 100 | B | 1.5 | 65 | 0 | G | 0.5 | 73 | 0 | 7 | free | free | 1810 | 1.8 |
| Ex. 25 | 100 | C | 1.5 | 65 | 0 | G | 0.5 | 73 | 1 | 9 | free | free | 1810 | 1.8 |
| Ex. 26 | 100 | D | 1.5 | 65 | 0 | G | 0.5 | 71 | 1 | 11 | free | free | 1800 | 1.7 |
| Ex. 27 | 100 | A | 1.5 | 65 | 0 | H | 0.5 | 71 | 1 | 10 | free | free | 1810 | 1.8 |
| Ex. 28 | 100 | A | 1.5 | 65 | 0 | I | 0.5 | 72 | −1 | 9 | free | free | 1810 | 1.8 |
| Ex. 29 | 100 | A | 1.5 | 65 | 0 | J | 0.5 | 71 | 0 | 11 | free | free | 1800 | 1.7 |

*Hue: A higher L value of the sample suggests a higher whiteness and a less extent of discoloration.

TABLE 3

| | Composition | | | | | | | Evaluation | | | | | | |
|---|---|---|---|---|---|---|---|---|---|---|---|---|---|---|
| | (A) PPS (pts. wt.) | (B) phosphorus compd. | | (C) glass fiber (pts.wt.) | (C) calcium carbonate (pts.wt.) | (D) silane compound | | hue* | | | black stripe, discoloration | gas evolution | tensile strength (kg/cm²) | tensile elongation (%) |
| | | kind (Note 1) | (pts. wt.) | | | kind (Note 2) | (pts. wt.) | L | a | b | | | | |
| Comp. Ex. 1 | 100 | — | 0 | 0 | 0 | — | 0 | 63 | 0 | 8 | slight | free | 850 | 10.2 |
| Comp. Ex. 2 | 100 | — | 0 | 65 | 0 | — | 0 | 61 | 1 | 7 | severe | free | 1750 | 1.6 |
| Comp. | 100 | — | 0 | 100 | 100 | — | 0 | 73 | −1 | 5 | severe | free | 1450 | 1.0 |

TABLE 3-continued

| | Composition | | | | | | Evaluation | | | | | | |
|---|---|---|---|---|---|---|---|---|---|---|---|---|---|
| | (A) PPS (pts. wt.) | (B) phosphorus compd. kind (Note 1) | (B) (pts. wt.) | (C) glass fiber (pts.wt.) | (C) calcium carbonate (pts.wt.) | (D) silane compound kind (Note 2) | (D) (pts. wt.) | hue* L | a | b | black stripe, dis- coloration | gas evo- lution | tensile strength (kg/cm²) | tensile elongation (%) |
| Ex. 3 Comp. Ex. 4 | 100 | E | 1.5 | 65 | 0 | — | 0 | 63 | 2 | 13 | medium | severe | 1690 | 1.4 |
| Comp. Ex. 5 | 100 | F | 1.5 | 65 | 0 | — | 0 | 64 | 1 | 10 | medium | severe | 1720 | 1.5 |
| Comp. Ex. 6 | 100 | — | 0 | 65 | 0 | G | 0.5 | 62 | 2 | 6 | severe | free | 1820 | 1.8 |

*Hue: A higher L value of the sample suggests a higher whiteness and a less extent of discoloration.

TABLE 4

| | Composition | | | | Evaluation | | | | | | |
|---|---|---|---|---|---|---|---|---|---|---|---|
| | (A) PPS (pts.wt.) | (B) phosphorus compd. kind (Note:1) | (B) (pts.wt.) | (C) glass fiber (pts.wt.) | (C) calcium carbonate (pts.wt.) | hue* L | a | b | black stripe, discoloration | gas evolution | tensile strength (kg/cm²) | tensile elongation (%) |
| Ex. 30 | 100 | A | 1.5 | 0 | 0 | 67 | 0 | 9 | free | free | 830 | 9.9 |
| Ex. 31 | 100 | A | 0.1 | 65 | 0 | 70 | 0 | 8 | slight | free | 1760 | 1.6 |
| Ex. 32 | 100 | A | 0.5 | 65 | 0 | 74 | 1 | 10 | free | free | 1760 | 1.6 |
| Ex. 33 | 100 | A | 1.5 | 65 | 0 | 74 | 0 | 9 | free | free | 1750 | 1.6 |
| Ex. 34 | 100 | A | 3 | 65 | 0 | 75 | 0 | 11 | free | slight | 1740 | 1.6 |
| Ex. 35 | 100 | A | 1.5 | 100 | 100 | 78 | 0 | 11 | free | free | 1430 | 1.0 |
| Ex. 36 | 100 | B | 0.1 | 65 | 0 | 72 | −1 | 9 | slight | free | 1740 | 1.6 |
| Ex. 37 | 100 | B | 0.5 | 65 | 0 | 74 | −1 | 10 | free | slight | 1740 | 1.6 |
| Ex. 38 | 100 | B | 1.5 | 65 | 0 | 74 | 0 | 12 | free | slight | 1730 | 1.6 |
| Ex. 39 | 100 | B | 3 | 65 | 0 | 76 | 0 | 13 | free | medium | 1730 | 1.6 |
| Ex. 40 | 100 | C | 0.1 | 65 | 0 | 69 | −1 | 10 | slight | free | 1760 | 1.6 |
| Ex. 41 | 100 | C | 0.5 | 65 | 0 | 72 | −1 | 9 | slight | free | 1760 | 1.6 |
| Ex. 42 | 100 | C | 1.5 | 65 | 0 | 74 | 0 | 10 | free | free | 1740 | .1.6 |
| Ex. 43 | 100 | C | 3 | 65 | 0 | 74 | 0 | 11 | free | slight | 1720 | 1.5 |
| Ex. 44 | 100 | D | 0.1 | 65 | 0 | 64 | 0 | 9 | slight | free | 1740 | 1.6 |
| Ex. 45 | 100 | D | 0.5 | 65 | 0 | 66 | 0 | 9 | slight | free | 1740 | 1.6 |
| Ex. 46 | 100 | D | 1.5 | 65 | 0 | 68 | 1 | 11 | slight | free | 1720 | 1.5 |
| Ex. 47 | 100 | D | 3 | 65 | 0 | 72 | 0 | 11 | free | slight | 1700 | 1.5 |

*Hue: A higher L value of the sample suggests a higher whiteness and a less extent of discoloration.

TABLE 5

| | Composition | | | | | | Evaluation | | | | | | |
|---|---|---|---|---|---|---|---|---|---|---|---|---|---|
| | (A) PPS (pts. wt.) | (B) phosphorus compd. kind (Note 1) | (B) (pts. wt.) | (C) glass fiber (pts.wt.) | (C) calcium carbonate (pts.wt.) | (D) silane compound kind (Note 2) | (D) (pts. wt.) | hue* L | a | b | black stripe, dis- coloration | gas evo- lution | tensile strength (kg/cm²) | tensile elongation (%) |
| Ex. 48 | 100 | A | 1.5 | 0 | 0 | G | 0.5 | 71 | 0 | 9 | free | free | 920 | 14.3 |
| Ex. 49 | 100 | A | 1.5 | 65 | 0 | G | 0.1 | 77 | 1 | 10 | free | free | 1770 | 1.6 |
| Ex. 50 | 100 | A | 1.5 | 65 | 0 | G | 0.5 | 79 | 1 | 11 | free | free | 1810 | 1.8 |
| Ex. 51 | 100 | A | 1.5 | 65 | 0 | G | 1.0 | 79 | 2 | 11 | free | free | 1820 | 1.8 |
| Ex. 52 | 100 | A | 1.5 | 100 | 100 | G | 0.5 | 82 | 0 | 11 | free | free | 1510 | 1.1 |
| Ex. 53 | 100 | B | 1.5 | 65 | 0 | G | 0.5 | 75 | 0 | 9 | free | free | 1800 | 1.7 |
| Ex. 54 | 100 | C | 1.5 | 65 | 0 | G | 0.5 | 76 | 1 | 10 | free | free | 1800 | 1.7 |
| Ex. 55 | 100 | D | 1.5 | 65 | 0 | G | 0.5 | 71 | 0 | 10 | free | free | 1780 | 1.6 |
| Ex. 56 | 100 | A | 1.5 | 65 | 0 | H | 0.5 | 76 | 2 | 10 | free | free | 1810 | 1.8 |
| Ex. 57 | 100 | A | 1.5 | 65 | 0 | I | 0.5 | 78 | 0 | 10 | free | free | 1800 | 1.8 |
| Ex. 58 | 100 | A | 1.5 | 65 | 0 | J | 0.5 | 76 | 1 | 11 | free | free | 1790 | 1.7 |

*Hue: A higher L value of the sample suggests a higher whiteness and a less extent of discoloration.

We claim:

1. A polyarylene sulfide composition comprising:
(A) 100 parts by weight of a polyarylene sulfide;
(B) 0.01 to 10 parts by weight of an organic bisphosphite having the formula:

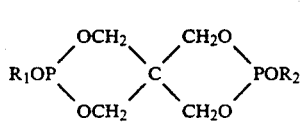

in which $R_1$ and $R_2$ are each an alkyl, an alkyl having at least one substituent, an aryl, an aryl having at least one substituent or an alkoxy;
(C) 0 to 400 parts by weight of an inorganic filler; and
(D) 0.01 to 5 parts by weight of at least one alkoxysilane selected from the group consisting of aminoalkoxysilanes, epoxyalkoxysilanes, mercaptoalkoxysilanes and vinylalkoxysilanes.

2. The composition as claimed in claim 1 wherein component (B) is present in amounts of 0.1 to 5 parts by weight based on 100 parts by weight of the polyarylene sulfide resin.

3. The composition as claimed in claim 1 wherein said inorganic filler (C) is a fibrous filler.

4. The composition as claimed in claim 3 wherein said fibrous filler is selected from the group consisting of glass fiber and carbon fiber.

5. The composition as claimed in claim 4 wherein said fibrous filler is glass fiber.

6. The composition of claim 1 wherein said filler (C) is present in amounts of 10 to 250 parts by weight per 100 parts by weight of said polyarylene sulfide.

7. The composition as claimed in claim 1 wherein said alkoxy silane (D) is present in amounts of from 0.01 to 3 parts by weight based on 100 parts by weight of the polyarylene sulfide resin.

8. The composition as claimed in claim 1 wherein said polyarylene sulfide is polyphenylene sulfide.

9. The composition as claimed in claim 8 wherein said polyphenylene sulfide is a homopolymer.

10. The composition as claimed in claim 9 wherein said polyphenylene sulfide homopolymer is a substantially linear polymer comprising p-phenylene sulfide groups as the repeating unit.

11. The composition as claimed in claim 8 wherein said polyphenylene sulfide is a polyphenylene sulfide copolymer comprising p-phenylene sulfide units and m-phenylene sulfide units.

12. The composition as claimed in claim 11 wherein said copolymer comprises at least 50 mole % of said p-phenylene sulfide units.

13. The composition as claimed in claim 12 wherein said polyphenylene sulfide copolymer comprises at least 70 mole % of said p-phenylene sulfide units.

14. The composition as claimed in claim 1 in which $R_1$ and $R_2$ are independently of one another selected from the group consisting of an alkyl having 5 to 23 carbon atoms, an alkyl having 5 to 23 carbon atoms and having thereon a hydroxy, an aryl selected from the group consisting of phenyl, naphthyl and biphenyl, an aryl selected from the group consisting of phenyl, naphthyl and biphenyl and having thereon an alkyl having 2 to 8 carbon atoms or a hydroxy and an alkoxy having 5 to 23 carbon atoms.

15. An article molded from the composition of claim 1.

16. The composition as claimed in claim 6 wherein said filler (C) comprises a mixture of a fibrous filler with a particulate or flaky filler.

17. The composition as claimed in claim 16 wherein said fibrous filler is glass fiber and said particulate or flaky filler is calcium carbonate.

* * * * *